United States Patent [19]

Mraz

[11] Patent Number: 5,528,578
[45] Date of Patent: Jun. 18, 1996

[54] DIGITAL INFORMATION RECORDING BY BURNING CONDUCTIVE SPOTS WITH ELECTRICAL PULSES IN AN INSULATING LAYER OR A RECORDING MEDIUM

[75] Inventor: Dennis Mraz, Saskatoon, Canada

[73] Assignee: P.M. Investments Inc., Saskatoon, Canada

[21] Appl. No.: 230,218

[22] Filed: Apr. 20, 1994

[51] Int. Cl.[6] .............................. G11B 5/84; G11B 5/008
[52] U.S. Cl. .................. 369/126; 369/44.18; 369/275.2; 369/280; 369/288; 360/90; 430/945; 430/485
[58] Field of Search .................................. 369/275.2, 100, 369/280, 275.4, 273, 288, 44.18; 360/59, 90; 430/270, 345, 495

[56] References Cited

U.S. PATENT DOCUMENTS 5,311,499   5/1994   Hwang ................................ 369/275.2

Primary Examiner—Georgia Y. Epps
Assistant Examiner—Kim-Kwok Chu
Attorney, Agent, or Firm—Morgan & Finnegan

[57] ABSTRACT

A method and apparatus for recording and playing back of a permanent digital information on a recording medium consisting of an insulating and a conductive layers of material, by creating spots of increased conductivity in the insulating layer.

14 Claims, 1 Drawing Sheet

DIGITAL INFORMATION RECORDING BY BURNING CONDUCTIVE SPOTS WITH ELECTRICAL PULSES IN AN INSULATING LAYER OR A RECORDING MEDIUM

FIELD OF THE INVENTION

The present invention relates generally to recording information and specifically to digital recording.

DESCRIPTION OF THE RELATED ART

Current methods of electronically recording information are either analog or digital. The analog recording of sound or picture is most prevalent in recording devices currently sold to the public, because analog devices are easier and cheaper to manufacture.

Most of analog or digital recording methods utilize the principle of magnetizing magnetic materials, such as metal oxides or metals, thinly coated on plastic tapes or discs. Unfortunately, all magnetic recordings deteriorate with time. This is particularly significant in devices for recording of picture, such as camcoders, where the magnetic analog recordings may deteriorate within ten to fifteen years to a point of being useless, depending on methods of storage and handling. Even where the information is stored in a digital form on a magnetic tape or a disc, such as with some sound recorders or in computers, it may deteriorate with time. Furthermore, magnetic recordings are prone to damage by magnetic fields from electrical devices.

The more permanent type of digital recording is recorded on a compact disc, which uses a method of burning holes in an aluminum foil with laser. However, this method of recording is not currently available to the general public, because the compact disc laser recording devices are very expensive. Therefore, it would be desirable to obtain a method of permanent digital recording, where a device for obtaining a digital record was more affordable.

SUMMARY OF THE INVENTION

An object of the present invention is therefore to obtain a more permanent nonmagnetic digital recording on tape, disc or other forms of recording mediums, by electronic means. Such recording is obtained by using a recording medium, such as tape, which consists of a layer of conducting material and a layer of an insulating material. The insulating layer of a recording medium is run over a recording/playback head containing electrodes in such a way that the insulating layer electrically separates the electrodes in the recording/playback head from the conductive layer in the recording medium connected to ground, thus interrupting the electrical circuit. The digital information is fed into the electrodes in a form of electrical pulses. The voltage of these pulses is sufficiently high to burn small holes in the insulating layer of the recording medium, thus providing a digital record consisting of holes in the insulating layer. Alternately, the electrical pulse melts a small area in both the insulating layer and the conductive layer and cause the conductive material to fill a spot in the insulating layer. In either case, each pulse provides a small spot of electrical conductivity in the insulating layer.

Playback of this digital record is accomplished by reversing the process, where the conductive layer of the recording medium is electrically charged and the spots of high conductivity in the insulating layer allow the pulses of electrical current to flow into the electrodes in the recording/playback head whenever such spot runs over the electrode. Clearly, in the playback mode, the electric current in the circuit needs to be only sufficient to provide pulses within the range of sensitivity of the digital decoding device. Therefore, the spots of conductivity created in the insulating layer during the recording mode do not need to be within a narrow range of size, shape or quality, as long as the playback signal falls within a predetermined, relatively broad range of signal strength.

Since the spots of conductivity in the insulating layer are created according to a predetermined pattern, the digital signal is created by the presence or absence of the conductive spots in the insulating layer, representing numerically either number 1 or number 0.

The proposed method and apparatus of digital recording is applicable for recording video, audio, computer records or any other information convertible into a digital signal.

DETAILED DESCRIPTION OF THE PREFERRED EMBODIMENTS

Figure 1:
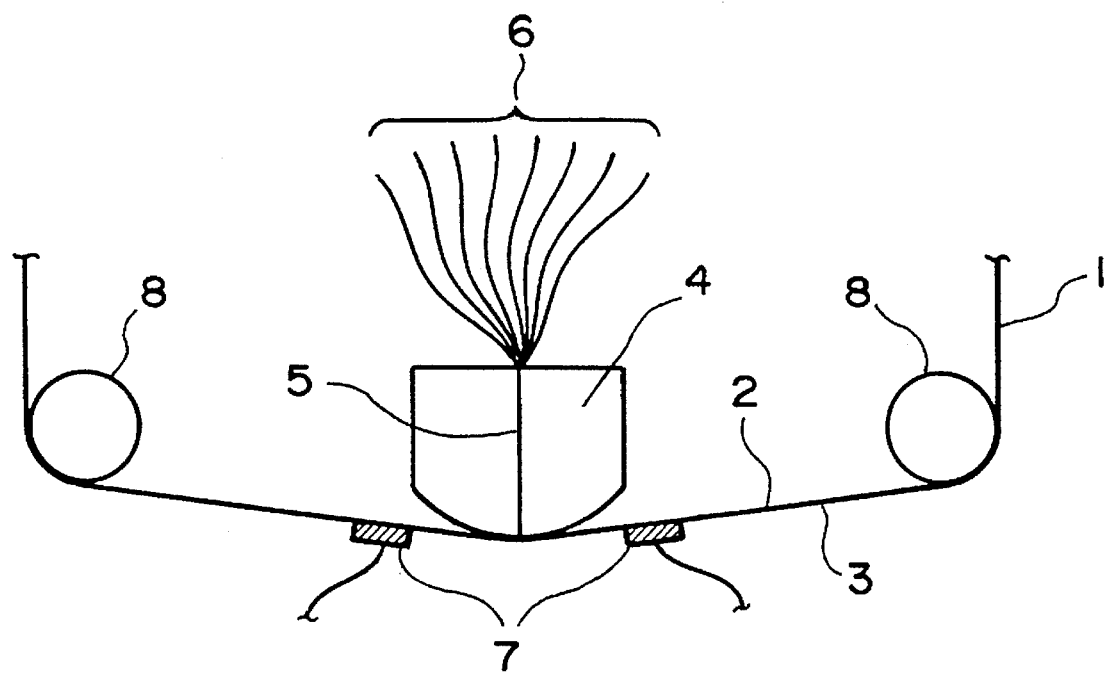
FIG. 1 is a top plan view of a preferred embodiment of the present invention.
Figure 2:
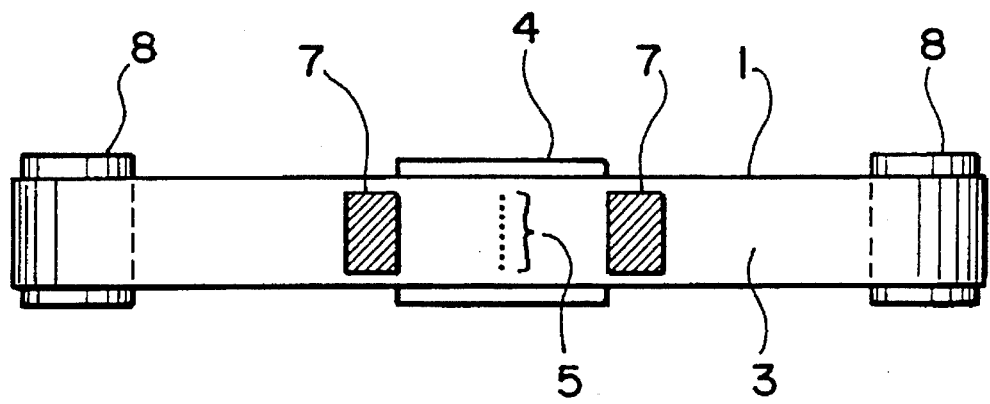
FIG. 2 is a front view of the embodiment of FIG. 1.

Referring to FIGS. 1 and 2, recording tape 1 consists of an insulating layer 2 and a conductive layer 3. Recording tape 1 is run at a constant speed over a recording/playback head 4 containing electrodes 5 which, in turn, are connected to the source of digital signals through electrical conductors 6. The conductive layer 3 is connected to an electrical ground through contact electrodes 7 or through one of the tape guide rollers 8. Digital signals in a form of electrical pulses in electrodes 5 cause burning of small holes in the insulating layer 2 or melting of both the insulating layer 2 and the conductive layer 3, thus creating spots of increased conductivity in the insulating layer 2 and providing a permanent digital recording.

Once such digital recording is made on the tape 1, it can be played back by reversing the process. The conductive layer 3 is charged with electric current and the spots of increased conductivity in the insulating layer 2 cause pulses of current to flow into the electrodes 5, thus playing back the recorded digital signal.

Numerous modifications and adaptations of the present invention will be apparent to those skilled in the art and it is intended by the following claims to cover all such modifications and adaptations which fall within the true spirit and scope of this invention.

What is claimed is:

1. A method of making a digital information recording in a recording medium having electrically insulating and electrically conductive layers, comprising:

creating data spots of increased conductivity in the insulating layer of the recording medium by electrical pulses, the data spots being patterned to represent digital information being recorded on the recording medium; and playing back the digital information by allowing electrical pulses to flow through the data spots of increased conductivity in the insulating layer of the recording medium, thus replicating the recorded digital information, the increased conductivity of the insulating layer resulting from exposure of the conductive layer.

2. A method as per claim 1, where the spots of increased conductivity in the insulating layer of the recording medium are made by vaporizing the insulating layer with electrical current.

3. A method as per claim 1, where the spots of increased conductivity in the insulating layer of the recording medium are made by vaporizing the insulating layer and simultaneously melting the conductive layer.

4. A method as per claim 1, where the spots of increased conductivity in the insulating layer of the recording medium are made by simultaneously melting both the insulating layer and the conductive layer with electrical current.

5. A method as per claim 1, where the spots of increased conductivity in the insulating layer of the recording medium are made by other means than by electrical current.

6. An apparatus for making a digital information recording in a recording medium having electrically insulating and electrically conductive layers, comprising:

means for creating data spots of increased conductivity in the insulating layer of the recording medium by electrical pulses, the data spots being patterned to represent digital information being recorded on the recording medium; and means for playing back the digital information by allowing electrical pulses to flow through the data spots of increased conductivity in the insulating layer of the recording medium, thus replicating the recorded digital information, wherein the increased conductivity of the insulating layer results from exposure of the conductive layer, and wherein the creating and playing means comprises a recording/playback head.

7. An apparatus as per claim 6, where the recording medium is a disc, consisting of insulating and conductive layers.

8. An apparatus as per claim 7, wherein the disc has insulating, conductive and structurally supporting layers.

9. An apparatus as per claim 7, where the number of electrodes in the recording/playback head is a multiple of eight.

10. An apparatus as per claim 6, wherein the recording medium is a tape having insulating and conductive layers.

11. An apparatus as per claim 6, where the number of electrodes in the recording/playback head is a multiple of eight.

12. An apparatus as per claim 6, wherein the recording medium is a tape having insulating, conductive and structurally supporting layers.

13. A method of recording and playing digital information, comprising the steps of:

forming a recording medium to include an electrically insulative layer on an electrically conductive layer;

contacting the insulating layer of the recording medium with a recording/playback head;

establishing an electric potential between the conductive layer and the recording/playback head sufficient to form data spots on the recording medium, thereby forming a digital recording; and changing the electric potential so that current passes from the conductive layer to the recording/playback head in a pulsed digital form through the data spots, thereby playing back the digital recording.

14. A method according to claim 13, wherein the insulating layer is grounded during formation data spots, and electrically charged when playing back the digital recording.

* * * * *